United States Patent [19]

Di Domenico

[11] 4,402,209

[45] Sep. 6, 1983

[54] LIQUID LEVEL FLOAT GAUGE CALIBRATION MEANS

[75] Inventor: Italo Di Domenico, Pittsford, N.Y.

[73] Assignee: Qualitrol Corporation, Fairport, N.Y.

[21] Appl. No.: 272,735

[22] Filed: Jun. 11, 1981

[51] Int. Cl.$^3$ ............................................. G01F 23/08
[52] U.S. Cl. ........................................ 73/1 H; 73/317; 116/291
[58] Field of Search ................. 73/1 H, 317; 116/291

[56] References Cited

U.S. PATENT DOCUMENTS

| | | | |
|---|---|---|---|
| 1,118,075 | 11/1914 | Toohey | 73/317 |
| 1,278,469 | 9/1918 | Horton | 73/317 |
| 1,850,746 | 3/1932 | Etnyre | 73/317 |
| 1,862,008 | 6/1937 | Crocker | 116/291 |
| 1,937,231 | 11/1933 | Klein | 73/317 |
| 2,318,727 | 5/1943 | Webb et al. | 116/291 |
| 2,436,212 | 2/1948 | Heintz | 73/317 |
| 3,857,286 | 12/1974 | Bissell | 116/291 |

Primary Examiner—Howard A. Birmiel
Attorney, Agent, or Firm—Stephen J. Rudy

[57] ABSTRACT

A liquid level gauge calibration means which utilizes slip clutch action between the gauge pointer shaft and the float rod. In setting the gauge range, either of said elements may be held stationary at a given point while the other element is moved to coordinate with the given point. Upon release of the element being held, the slip clutch is effective to maintain the established relationship between the two elements. A tool is used to move the slip clutch as needed for desired relative setting of the two elements.

3 Claims, 4 Drawing Figures

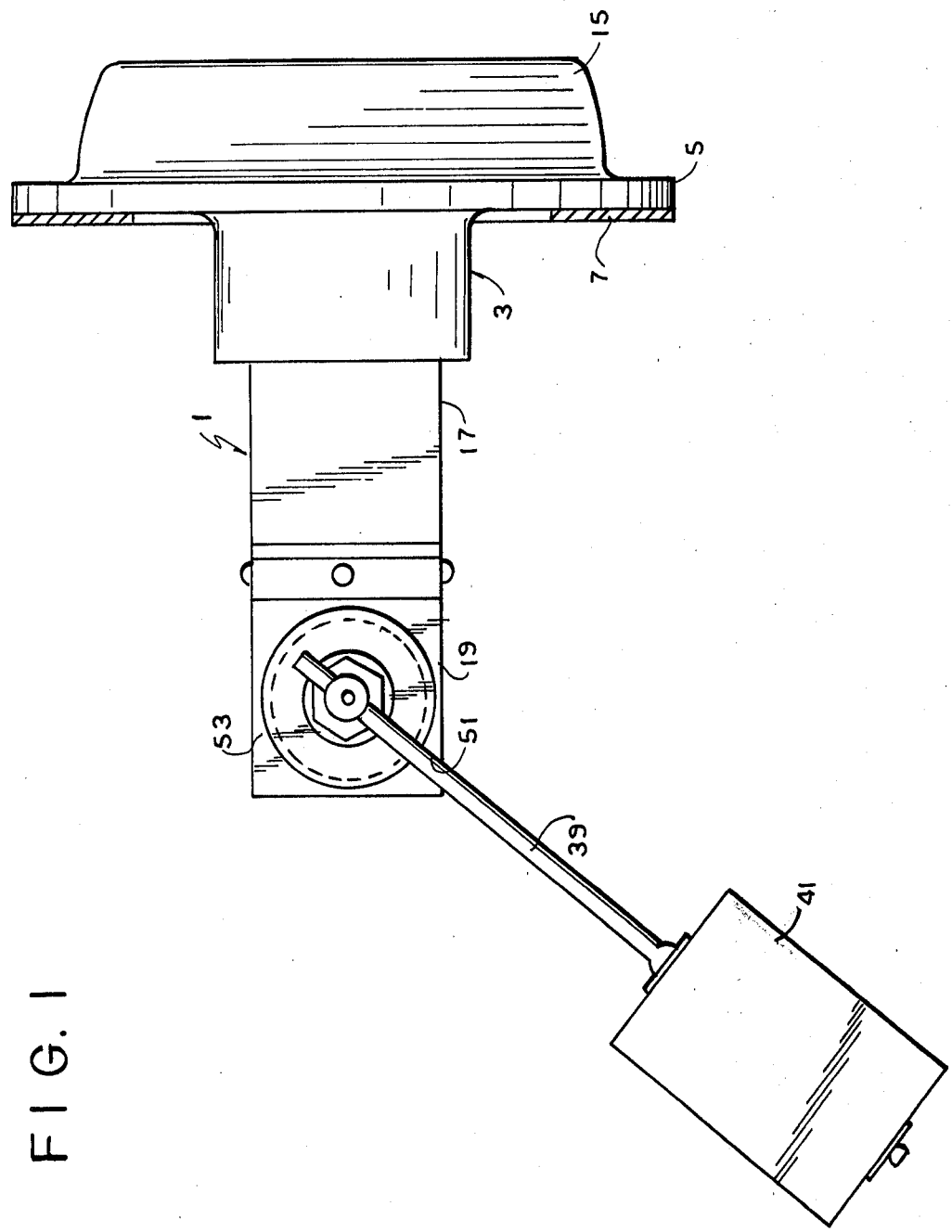

LIQUID LEVEL FLOAT GAUGE CALIBRATION MEANS

This invention relates to liquid level float gauges, and more particularly to means for calibration of a gauge float arm with a gauge readout pointer, which means is simple in structure and use, and which permits easy re-calibration if desired.

INVENTION BACKGROUND AND OBJECTIVES

A problem associated with liquid level gauges having gear drives is that calibration of float arm movement with gauge readout pointer position to reflect a given liquid level throughout full gauge range, requires a secure setting between these elements after calibration is accomplished. Such a setting, which is usually achieved by staking or soldering, does not allow easy re-calibration in event such is required.

The main object of this invention is to provide a means whereby calibration of a liquid level gauge float arm and the gauge readout pointer can be made in an expeditious manner, and which allows easy re-calibration if desired.

A further object is to provide a liquid level gauge having calibration means which will remain stable during the operative life of the gauge.

Still another object of the invention is to provide a liquid level gauge calibration means which accomplishes the desired objectives in a new and novel manner.

These and further objects and features of the invention will become evident from the invention disclosure which follows.

BRIEF DESCRIPTION OF THE DRAWINGS

FIG. 1 is an exterior side view of a liquid level float gauge assemblage incorporating a preferred embodiment of the invention;

THE INVENTION

Figure 3:
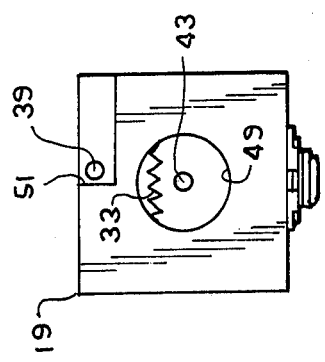
FIG. 3 is an end view of an adapter means used in the gauge assemblage of FIG. 1.
Figure 2:
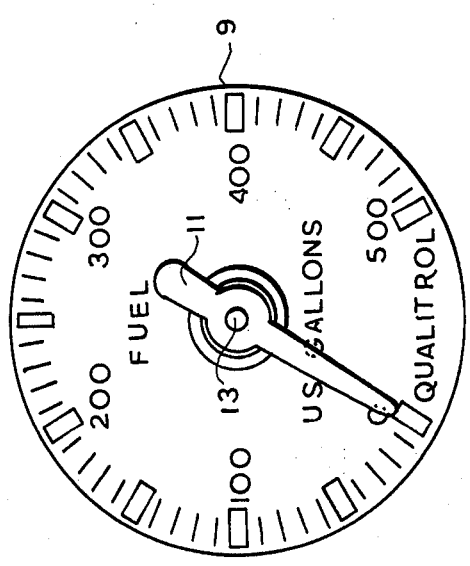
FIG. 2 is a view showing a dial with circumferential indicia indicating gallons, and a dial pointer.

Referring now to FIGS. 1 and 2, numeral 1 identifies a liquid level gauge having a housing 3, including a flange 5 for mounting upon a wall 7 of a tank (partially shown). The front part of the gauge has a dial or gauge plate 9, with numerals circumscribed thereon to indicate quantity of liquid measured, in predetermined units of measurement such as gallons, however, other parameters could be indicated, i.e., liquid level. A pointer 11 supported on a shaft 13, is arranged to indicate quantity measurement, all in a well known manner. The gauge plate 9 is enclosed by a transparent cover, or crystal 15. The housing 3 has a reduced portion 17 to which is affixed an adapter 19 enclosing a calibration means 21 incorporating the structure of the invention.

Figure 4:
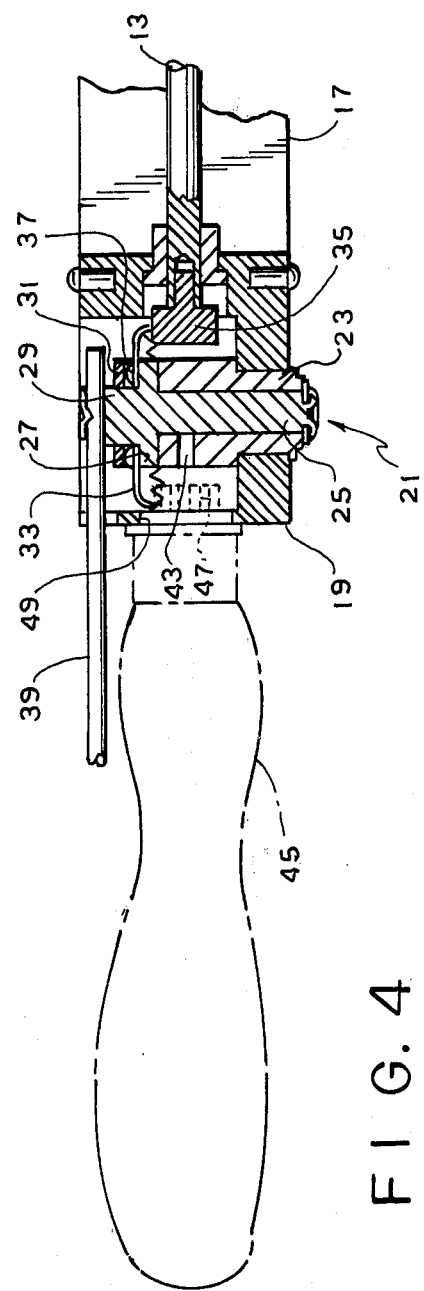
FIG. 4 is a sectional view of the adapter means of FIG. 2.

As best seen in FIG. 4, the calibration means includes a bearing 23 fixedly mounted in the adapter 19, and a shaft 25 rotatably supported in the bearing 23. The shaft 25 has a flange portion 27, one surface of which seats upon the bearing 23, the other side of the flange having an enlarged shaft portion 29 which is threaded to receive a nut 31. A gear means 33, of the crown gear type, is mounted upon the flange 27, the teeth thereof being arranged to mesh with a pinion 35 affixed to the end of the pointer shaft 13. A spring washer 37 is positioned between the nut 31 and the gear means 33.

A liquid level float arm 39 has one end fixed to the shaft portion 29, the other end of the arm having a float 41, which is normally submerged in the liquid to be measured. As the float rises or falls in the tank, the shaft 25 will be rotated and the gear 33 will transmit such rotary motion to the pointer shaft 13 via the connection with the pinion 35.

A pilot hole 43 is formed in the bearing 23 to receive the end of a tool 45, a gear portion 47 thereof being extendable through an opening 49 provided in the rear wall of the adapter 19, and in meshing relation with the teeth of the gear means 33. As best seen in FIG. 1, a portion of one surface of the adapter 19 is recessed to provide abutment means 51 and 53, to limit rotary travel of the float arm 39, in accordance with the gauge scale, or range.

To calibrate the liquid level gauge to indicate actual liquid level, or volume, that is, to have the float arm and pointer in proper operative relationship, the tool 45 is inserted into the adapter and the float rod held in a given liquid level position. If the pointer 11 does not actually indicate the given liquid level position, the tool 45 is rotated thus causing rotation of the gear 33, resulting in rotation of the pointer shaft 13. Once the pointer is thus moved to proper indicating position, the tool 45 is removed and the spring washer 37 will maintain the set condition of the pointer relative to the float shaft. Compression adjustment of the spring washer to maintain the gear means 33 in position is made by rotation of the nut 31.

It will be seen that the calibration means of the invention will operate to satisfy all of the objectives of the invention as set forth herein before.

While certain changes may be made in structural details of the invention without departing from the spirit of the invention, it is understood that any such structural changes which respond to the language of the claims, shall be deemed to be an infringement thereof.

What is claimed is:

1. A liquid level gauge including a housing, a liquid level dial mounted upon the housing, a driving shaft rotatably supported in the housing, a pointer attached to the driving shaft adjacent the dial to indicate liquid level in a tank upon which the housing is mounted, a float assemblage including a float arm and a float connected thereto, an adapter secured to a reduced portion of the housing, a gear arranged in the adapter to couple the float arm and the driving shaft, calibration means positioned in the adapter operable to provide calibration between pointer movement and float movement, said adapter being formed with an opening for receipt of a tool for rotation of the crown gear by slip coupling means to the shaft, a tool capable of being inserted into said opening comprising a gear for engaging said crown gear and a pinion affixed to an end of the driving shaft, said pinion being arranged to mesh with the crown gear.

2. A liquid level gauge according to claim 1, wherein the calibration means includes a shaft rotatably supported in a bearing affixed to the adapter, said gear rotatably supported on said shaft, and a spring washer in abutment with the gear.

3. A liquid level gauge according to claim 2, wherein a nut is threaded on the shaft and in engagement with the spring washer, and said nut serving to regulate pressure engagement between the gear and the shaft.

* * * * *